Sept. 8, 1970  R. S. EMERSON  3,527,089
APPARATUS FOR TESTING ENGINE FUEL INJECTORS
Filed Sept. 13, 1968  2 Sheets-Sheet 1
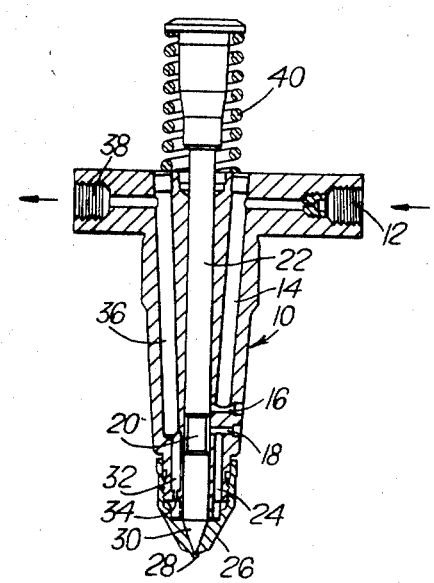
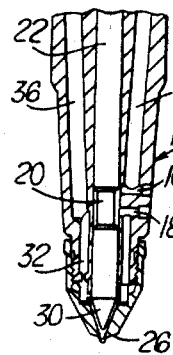 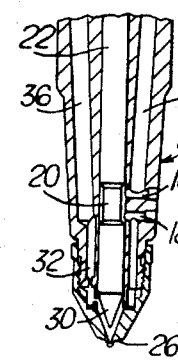 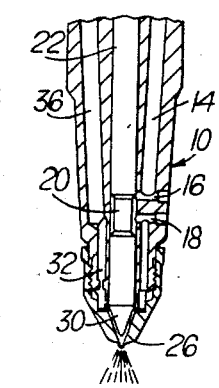 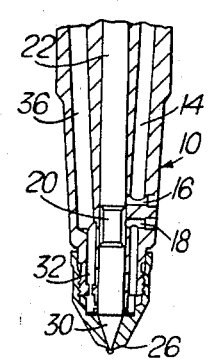
Inventor
REGINALD S. EMERSON,
By Berman, Davidson & Berman
Attorneys

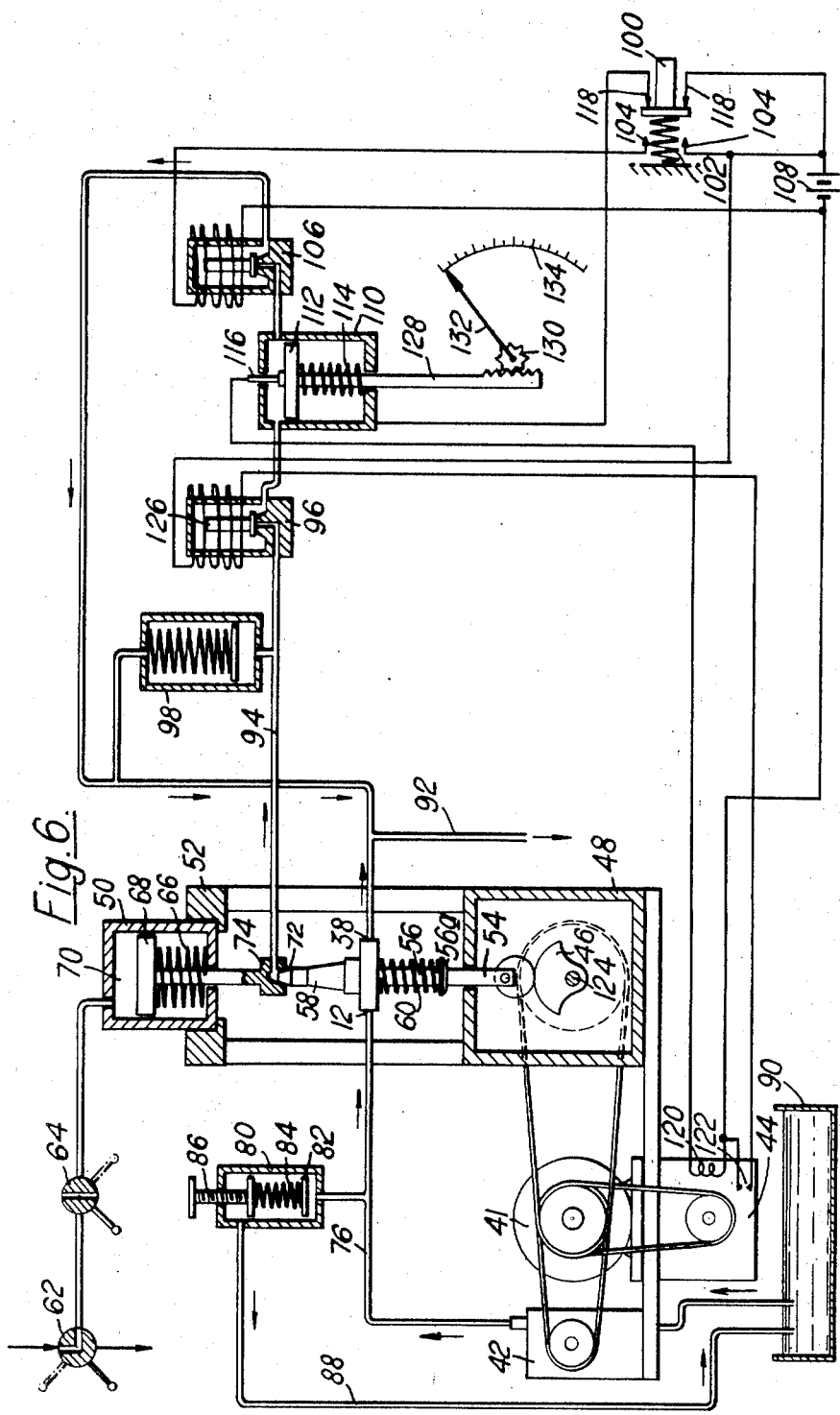

United States Patent Office 3,527,089
Patented Sept. 8, 1970

3,527,089
APPARATUS FOR TESTING ENGINE FUEL INJECTORS
Reginald S. Emerson, Buckingham, England, assignor to Leslie Hartridge Limited, Buckingham, England, a British company
Filed Sept. 13, 1968, Ser. No. 759,718
Claims priority, application Great Britain, Sept. 14, 1967, 42,011/67
Int. Cl. G01m 15/00
U.S. Cl. 73—119                    7 Claims

ABSTRACT OF THE DISCLOSURE

Apparatus for testing the fuel injectors of compression ignition engines, the apparatus comprising an accurate fuel-metering device for measuring the amount of fuel delivered by an injector under test, and fuel pressure-varying means by which the quantity of fuel collected by the metering device can be varied by varying the pressure of the fuel fed to the injector.

---

This invention relates to apparatus for testing the fuel injectors of compression ignition engines.

Among the injectors which are available commercially are those which comprise a cylinder in which there slides a plunger. When the plunger is retracted by a spring, fuel fed under pressure to the injector is metered into a pumping space by passing through a series of orifices. By using a cam to depress the plunger to the end of its stroke, the fuel previously metered into the pumping space is ejected through spray holes in the nozzle cap. The volume of fuel thus pumped into the engine by the injector is a function of the pressure of the fuel fed to the injector, this pressure being controlled on the engine by a separate pump provided with the equivalent of a throttle control and a governor.

In order to test an injector of this construction, it has already been proposed to clamp it in testing apparatus and to reciprocate the plunger by a cam in a cambox forming part of the testing apparatus. Means are also provided for metering the fuel delivered from the nozzle spray holes of the injector resulting from reciprocation of the plunger, and in this way the proper working of the injector can be checked. The apparatus normally operates as a "comparator," that is to say, the fuel delivered by the injector under test is compared with the amount delivered by a master injector when fitted in the same apparatus. The quantity of fuel which should be delivered by the injector under test, and also that delivered by the master injector, is specified by the manufacturer of the injector. Prior to testing an injector, therefore, the testing apparatus must be "calibrated." To do this, means must be provided in the apparatus whereby the delivery of fuel from the master injector can be adjusted so as to give the specified quantity. The quantity normally specified by the manufacturer is that amount of fuel which will be delivered, at a specified fuel feed pressure and rate of reciprocation of the injector plunger, over nominally one thousand strokes of the plunger. Means are provided on the apparatus for adjusting the number of strokes over which the fuel is collected, the apparatus having a counting mechanism which may be pre-set, in units, to any required number.

In order to calibrate the apparatus, the master injector is fitted and the apparatus is started. A fuel delivery reading is taken over about 1,000 strokes of the injector plunger and is noted. If this quantity is below that specified by the manufacturer, the number of strokes is increased and a second reading taken. If this reading is still too low, the number of strokes is again increased until the reading obtained is exactly equal to that specified. The apparatus is then said to be calibrated.

As the number of strokes in nominally 1,000, the accuracy with which the apparatus is capable of calibration is 1 stroke in 1,000, that is to say, 0.1%. Furthermore, since the specified operating speed is approximately 1,000 r.p.m., the time taken for one reading is approximately 1 minute. And, since a minimum of three readings in necessary to calibrate an injector and the fuel measuring mechanism must be drained or re-set prior to each "run" of 1,000 strokes of the injector plunger, the actual time taken to calibrate each injector to be tested is considerably over 1 minute.

It is a primary object of the present invention to speed up this operation by reducing the number of plunger strokes over which fuel is metered. However, if the number of strokes is reduced to, say, 100, the maximum accuracy to which the apparatus can now be calibrated is 1 stroke in 100, that is to say, 1%. At the same time the volume of fuel delivered by the injector will only be $\frac{1}{10}$ of the previously mentioned volume, and this means that any inaccuracy in measuring will be magnified ten times. To achieve the above object, therefore, the metering unit must have a high accuracy, and it is also necessary to provide adjustment means whereby the machine can be calibrated much more finely than one part in 100.

The invention has been devised with these considerations in mind, and is based on the fact that the output of the injector is partially controlled by the pressure of fuel fed to it. Accordingly, apparatus for testing the fuel injectors of compression ignition engines includes an accurate fuel-metering device for measuring the amount of fuel delivered by an injector under test, and fuel pressure-varying means by which the quantity of fuel collected by the metering device can be varied by varying the pressure of the fuel fed to the injector.

In one form of testing apparatus in accordance with the invention the apparatus has a fuel reservoir, a fuel feed pump for supplying fuel to the injector to be tested, clamping means for holding the injector on the apparatus, a cam and camshaft for operating the plunger of the injector, a fuel measuring device comprising a displacement piston acting in conjunction with a dial and pointer for measuring the volume of fuel delivered, a counter for counting accurately the number of turns of the camshaft, means for conveying to the metering device the fuel delivered by the injector for a precise number of camshaft turns (for example, 100 turns), fuel-pressure varying means for controlling the pressure of fuel fed by the feed pump to the injector, driving means for driving the camshaft at a fixed speed, a valve for directing the fuel delivered by the injector either back to the fuel reservoir or to the fuel metering device, and means for returning the metered fuel back to the reservoir.

An example of a fuel injector which can be tested on the apparatus of the invention and an example of such apparatus are shown in the accompanying drawings, in which:

FIG. 1 is a vertical section through a fuel injector of the kind provided with a pumping plunger;

FIGS. 2–5 are further sectional views through the injector of FIG. 1 illustrating its operation; and FIG. 6 is a diagrammatic illustration of apparatus in accordance with the invention for testing the injector shown in FIG. 1.

As indicated already, the invention is of particular benefit in the testing of fuel injectors having a pumping plunger which performs the dual function of pumping and injecting and where fuel circulates through the injector during normal operation. Such an injector is shown in FIG. 1, the injector comprising a body 10 having a fuel inlet 12 which leads into a passage 14. At its lower end, the passage 14 joins a transverse bore 16 which can be placed in communication with a similar bore 18 whenever a valve portion 20 on a plunger rod 22 takes up any of the positions shown in FIGS. 2–4. The bore 18 is joined to a passage 24 which leads downwards into a nozzle or cup 26 which has a fuel-injection orifice 28 at its lowest point. This orifice is closed when the plunger rod 22 is in the position shown in FIG. 5, this being due to the conical lower end 30 of the plunger rod which is able to seat snugly on the conical inner surface of the cup 26.

A fuel-return passage 32 having a metering orifice 34 to regulate the back-flow of fuel leads back from the cup 26 and joins a larger passage 36 corresponding to the inlet passage 14. The passage 36 leads into a drain outlet 38 at its upper end, thus allowing fuel to circulate through the injector passage while the injector is in use.

The plunger rod 22 is urged upwards by a helical spring 40 so that its conical end 30 is raised clear of the cup 26 as shown in FIG. 3. Injection of fuel through the orifice 28 is therefore accomplished by pushing the plunger rod 22 further into the body 10 against the action of the spring, such movement of the plunger usually being effected by a cam on the engine cam shaft. FIGS. 2–5 illustrate the position of the plunger rod 22 at different instances in the fuel-injection cycle. Thus, FIG. 2 shows the plunger rod 22 moving upwards at the start of the up-stroke, FIG. 3 shows the position at the end of the up-stroke, FIG. 4 shows fuel being delivered through the orifice 28 as the plunger rod descends, and FIG. 5 shows the plunger rod at the bottom of its down-stroke when the end 30 of the rod seats against the cup 26. From these figures it will be seen that the valve portion 20 on the rod 22 permits the flow of fuel to the cup 26 at all positions of the rod except when the end 30 of the rod is seated against the cup as in FIG. 5. In this position the valve 20 lies below the level of the transverse bore 16, with the result that communication between the bore 16 and the bore 18 is shut off.

Turning now to FIG. 6, this shows apparatus in accordance with the invention for testing a fuel injector of the construction shown in FIG. 1. The illustrated apparatus comprises an electric motor 41 which drives through separate belts a fuel pump 42, a stroke-counting gear 44 and a cam 46. The cam 46 is enclosed in a cambox 48 which supports an hydraulic ram 50 by means of two pillars 52. A tappet 54 of the cam box operates the plunger 56 of an injector 58 under test, the plunger of the injector being returned by a spring 60.

Prior to the injector 58 being clamped in position on the apparatus, the cam 46 is brought to the position shown in the drawing so that the tappet is at maximum lift. A clamp control valve 62 is also moved into the "unclamp" position shown in broken lines, while a lock valve 64 is moved into the "free" position, likewise shown in broken lines. Under these conditions, a spring 66 pushes a piston 68 in the ram upwards so as to exhaust oil out of the space 70 in the ram 50 and return it to an oil tank not shown in the drawing. The injector 58 is now placed in position with the lower end 56a of its plunger 56 in contact with the tappet 54 and its nozzle 72 below the nose piece 74 of the clamping ram 50. The control valve 62 is then brought into the illustrated "clamp" position so that oil from a suitable source (not shown) passes through the valve 62 and the valve 64 into the space 70 so as to push the piston 68 downwards, thereby compressing the spring 66 and clamping the injector 58 between the nose piece 74 and the tappet 54. The lock valve 64 is now brought into the illustrated lock position so that the volume of oil in the space 70 can neither increase nor decrease.

The main motor 41 is then started, and the cam 46 thereby rotates so as to reciprocate the plunger 56 of the injector 58. At the same time, the pump 42 delivers fuel oil through a pipe 76 to the inlet fuel connection 12 of the injector 58. When the pressure has built up to a predetermined value, the fuel oil passes towards a relief valve 80 where it raises a plate 82 against the opposition of a spring 84 which is adjustable by a screw 86. Excess fuel then passes through a pipe 88 back to a fuel tank 90 so that the valve 80 maintains a pre-determined pressure at the injector inlet 12. The drain fuel from the drain outlet 38 of the injector 58 passes via a pipe 92 back to the tank 90, while injected fuel from the nozzle 72 of the injector passes into the nose piece 74 and along a pipe 94 towards a solenoid valve 96 which is closed. The pressure in the pipe 94 then rises sufficiently to open a spring-loaded relief valve 98 which is set to open at a suitable relief pressure, and the fuel thereafter passes through the pipe 92 back to the tank 90.

When it is required to take a fuel delivery reading, a control button 100 is depressed against the opposition of a return spring 102 so as to close two contacts 104. This causes the solenoid of a solenoid valve 106 to be energised by a power source 108, thereby opening the solenoid valve 106 so that fuel from the previous reading contained in a metering chamber 110 is expelled by a piston 112 under the influence of a spring 114 via the solenoid valve 106 and the pipe 92 back to the tank 90. The piston 112 moves upwards under the action of the spring 114 until it touches a contact 116 which acts as a stop. The button 100 is now released and moves under the action of the spring 102 so as to close a pair of contacts 118. Current then flows from the source 108 through the closed contacts 118, the piston 112, the contact 116, and the stroke counter solenoid 120 back to the source 108. The solenoid 120 is therefore energised and closes the contact 122 for 100 turns of the camshaft 124. When the contact 122 closes, the solenoid valve 96 is energised and the plunger 126 lifts so as to open the orifice within the valve. Fuel oil under pressure in the pipe 94 accordingly passes through the valve 96 to the chamber 110 and depresses the piston 112 against the action of the spring 114. The piston rod 128 of the piston, by means of a rack and pinion 130, causes a pointer 132 to deflect and to read on a scale 134, the scale being calibrated to read the number of ccs. of fuel entering the chamber 110. The solenoid of the solenoid valve 106 has previously closed when the button 100 was released and the contacts 104 were opened.

After the termination of 100 strokes, the stroke counter 44 opens the contacts 122 and closes the solenoid valve 96 so as to prevent the further ingress of fuel into the metering chamber 110. Both the solenoids 96 and 106 now being closed, the fuel within the chamber 110 remains there and the pointer 132 indicates the fuel content in the chamber in cc.

During calibration of the machine, the injector 58 is the master injector. In order to make the reading on the scale 134 coincide with the current output of that master injector, the screw 86 of the valve 80 is adjusted so as to vary the fuel feed pressure in the pipe 76 feeding the injector until the correct reading is obtained on the scale. After the calibration has been completed, any other injector to be tested can be fitted in place of the master injector and the pointer 132 will indicate the actual output of that injector compared with the master injector. The injector under test can then be adjusted by means specified by the manufacturer until it gives the correct output.

In practice, the rack and pinion 130, the pointer 132 and the scale 134 can take the form of a standard engineering dial indicator. The dial indicator and the diameter of the piston 112 are suitably chosen so as to give an amplified reading, say 1 turn of the needle for each cc. injected into the chamber 110. The pointed therefore makes 20 turns for 20 cc. injected into the chamber. The scale will normally be calibrated into 100 divisions so that each division represents 0.01 cc. The scale can therefore be read to 4 significant figures, the accuracy of reading being far in excess of that possible using a graduated tube.

An alternative arrangement of the valves 96 and 98 is also practicable. Thus, the valve 96 can be placed in the circuit in the same sense as the valve 98 so that, when energised, it relieves oil from the pipe 94 via the pipe 92 back to the tank. At the same time, the valve 98 can be placed in the circuit in the same sense as the valve 96 so that when the pressure in the pipe 94 rises sufficiently to open the valve 98, fuel can then pass into the chamber 110. With such an arrangement, the contacts 122 in the stroke counter 44 must operate in the opposite sense so that, during the counting period, the valve 96 is de-energised and is therefore closed. The closure of the valve 96 would then cause fuel in the pipe 94 to rise in pressure sufficiently to open the valve 98 and so pass to the chamber 110. When the valve 96 is opened, the fuel in the pipe 94 should be allowed free access via the pipe 92 back to the tank. In all other respects, the mechanism would work as previously described.

The machine shown in the drawing is operated in the following manner.

The master injector is clamped in the machine, the machine is started up, and the operating button 100 is depressed so as to deflect the fuel from the injector 58 to the metering chamber 110 over a period of 100 turns of the camshaft. The fuel displaces the piston 114 in the metering chamber 110 and is retained therein after the end of the count. The piston 114 displaces the pointer 132 of the dial which indicates the volume of fuel contained in the cylinder. Let us assume that this master injector must produce a reading of 132. Then, if the reading obtained is less than 132, the fuel feed pressure control screw 86 is adjusted to increase the fuel feed pressure slightly. The operating button 100 is depressed again to drain the fuel from the metering chamber and then released so as to once more deflect fuel from the injector 58 to the metering chamber 110 for a period of 100 turns. This process is repeated until the reading obtained on the dial is 132 exactly. The machine is then correctly calibrated and ready for testing any other injector.

The fuel delivery quantities published by the makers represent the delivery of fuel measured in cc. at a nominal speed of 1,000 r.p.m. over a nominal period of 1,000 turns at a fuel feed pressure of exactly 120 p.s.i. But as has already been stated, the machine is a comparator and therefore it is immaterial whether the output is measured over a nominal number of turns at a precise fuel feed pressure (as prescribed by the manufacturers) or whether it is measured over a precise number of turns at a nominal feed pressure (as proposed by the invention).

The machines used hitherto normally measure the output in ccs. over nominally 1,000 turns. Let us, for example, assume that a certain injector delivers 150.5 cc. under these conditions. The invention proposes that the output shall still be measured in ccs., but over 100 turns. This same injector would therefore deliver only 15.05 cc. and this means that the actual digits in the indicated delivery will be the same in either case but the decimal point in the proposed inveniton will be moved one place to the left. The machine is therefore capable of working from the same test schedule figures as at present.

With apparatus according to the invention, it is clear that fuel delivery readings can be taken at least ten times as quickly as with existing apparatus. Furthermore, due to the extreme accuracy of the metering means, the overall accuracy of the whole machine can be made to excel the accuracy of older machines using graduated containers.

I claim:
1. Apparatus for testing the fuel injectors of compression ignition engines comprising: means for receiving the fuel-delivery nozzle of an injector to be tested, cam means for actuating the injector, a motor for driving the cam means, fuel-supply means for supplying fuel to the injector, an accurate fuel-metering device for collecting and measuring the amount of fuel delivered by the injector while the injector is under test, and fuel pressure-varying means for varying the pressure of the fuel supplied by the fuel-supplying means whereby the quantity of fuel collecting by the fuel-metering device can be varied within pre-determined limits.

2. Apparatus according to claim 1, in which the fuel-supplying means include a fuel reservoir and a fuel-feed pump having its suction side connected to the reservoir, the pump being driven by the motor which drives the cam means.

3. Apparatus according to claim 1, in which the means for receiving the fuel-delivery nozzle of the injector comprise a nose piece carried by the piston of an hydraulic ram which presses the injector axially towards the cam means.

4. Apparatus according to claim 1, in which the motor is adapted to drive the cam means at a fixed pre-determined speed, counting means being provided to count accurately the number of turns of the cam means.

5. Apparatus according to claim 1, in which the fuel-metering device comprises a displacement piston arranged for movement in accordance with the amount of fuel delivered by the injector to a chamber.

6. Apparatus according to claim 1, in which the fuel pressure-varying means comprise an adjustable relief valve connected to a fuel-supply passage leading to the injector under test whereby adjustment of the relief valve adjusts the pressure of the fuel in the fuel-supply passage.

7. Apparatus for testing the fuel injectors of compression ignition engines, the injectors having reciprocating plungers for the delivery of fuel, which apparatus comprises: a fuel reservoir, a fuel feed pump in communication with the fuel reservoir for supplying fuel to an injector to be tested, clamping means for holding the injector on the apparatus, a cam and camshaft for operating the plunger of the injector, a fuel metering device comprising a displaceable piston arranged to act in conjunction with a dial and pointer for measuring the volume of fuel delivered by the injector, a count for counting accurately the number of turns of the camshaft, means for conveying to the metering device the fuel delivered by the injector for a precise number of camshaft turns, fuel pressure varying means for varying the pressure of fuel fed by the feed pump to the injector, driving means for driving the camshaft at a fixed speed, a valve for directing the fuel delivered by the injector either back to the fuel reservoir or to the fuel metering device, and means for returning the metered fuel back to the reservoir.

References Cited
UNITED STATES PATENTS 2,517,766   8/1950   Cole.
3,367,176   2/1968   Emerson.

JERRY W. MYRACLE, Primary Examiner